United States Patent [19]

Körber

[11] 4,198,672

[45] Apr. 15, 1980

[54] FLASHING DEVICE

[75] Inventor: Hermann Körber, Bünde, Fed. Rep. of Germany

[73] Assignee: Balda-Werke Photographische Gerate & Kunststoff GmbH & Co. K.G., Fed. Rep. of Germany

[21] Appl. No.: 881,104

[22] Filed: Feb. 24, 1978

[30] Foreign Application Priority Data

May 11, 1977 [DE] Fed. Rep. of Germany ....... 2721178

[51] Int. Cl.² ............................................. G03B 15/02
[52] U.S. Cl. ........................................ 362/7; 362/11; 362/12; 362/295
[58] Field of Search ................... 362/7, 3, 11, 12, 295

[56] References Cited

U.S. PATENT DOCUMENTS 3,852,790  12/1974  Robinson ............................. 362/7 X
3,982,117  9/1976  Betlejewski ............................. 362/3

*Primary Examiner*—Stephen J. Lechert, Jr.
*Attorney, Agent, or Firm*—Blum, Kaplan, Friedman, Silberman & Beran

[57] ABSTRACT

A dual mode flash unit for a camera for selectively actuating either an electronic flash tube or a high-voltage flash bulb. The flash unit includes a high-voltage supply for selectively applying a high-voltage pulse to an electronic flash tube during normal operation and for applying a high-voltage pulse to a high-voltage flash bulb when same is inserted into the electronic flash unit.

6 Claims, 5 Drawing Figures

FLASHING DEVICE

BACKGROUND OF THE INVENTION

This invention relates generally to a flash attachment for a camera. Two different types of light-producing flash attachments are actuated by a high-voltage pulse, an electronic flash tube and a high-voltage combustion flash bulb. High-voltage combustion flash bulbs are actuated by a peizo-electric quartz crystal incorporated in the camera, which crystal is mechanically vibrated. The piezo-electric quartz crystal is utilized to produce a high-voltage pulse. Heretofore, cameras not having piezo-electric quartz crystals were incapable of actuating high combustion flash bulbs.

It is noted, however, that flash units having electronic flash tubes have a suitable high-voltage supply therein for producing voltage pulses of sufficient magnitude to activate the flash tube, and can be used with any type of camera. However, there are times when the use of a high-voltage combustion type flash bulb is preferred, even if an electronic flash tube is available. For example, when a very high light yield is required, high-voltage combustion flash bulbs provide light of a greater intensity than a standard flash tube. Additionally, a high-voltage combustion bulb can be utilized in rapid flash sequences, where four frames are taken by a motor-driven camera capable of taking several pictures per second.

SUMMARY OF THE INVENTION

Generally speaking, in accordance with the invention, a dual mode flash unit for a camera, capable of actuating an electronic flash tube or a high-voltage combustion flash bulb, is provided. A high-voltage supply is used to selectively apply a high-voltage pulse to an electronic flash tube in order to actuate same. The flash unit is adapted to receive a high-voltage flash bulb and couple same to the high-voltage supply to effect actuation thereof.

Accordingly, it is an object of this invention to provide a dual mode flash unit for actuating high-voltage flash bulbs.

Another object of this invention is to provide an improved dual mode flash unit for actuating an electronic flash tube or high-voltage combustion type flash bulb.

A further object of this invention is to provide an improved flash unit wherein the operation of the electronic flash tube is prevented when a high-voltage flash bulb is actuated thereby.

Still another object of this invention is to provide a dual mode flash unit for providing actuation, in rapid sequence, of the flash unit when the camera is absent a high-voltage pulse supply.

Still other objects and advantages of the invention will in part be obvious and will in part be apparent from the specificaton.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
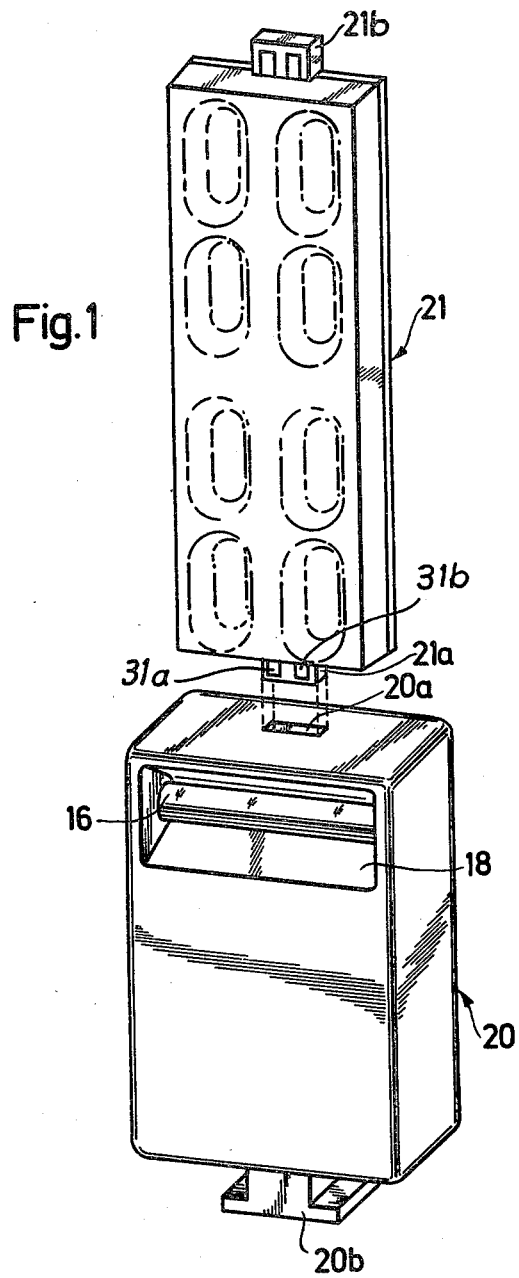
FIG. 1 is a perspective view of the dual mode flash unit constructed in accordance with a preferred embodiment of the instant invention.

Reference is now made to FIG. 1, wherein a dual mode electronic flash unit, generally indicated as 20, is depicted. The flash unit 20 includes a case having an opening formed in the front surface. A reflector 18 and electronic flash tube 16 are disposed in the opening. The case further includes a shoe 20b projecting from the lower surface thereof to effect mounting of the unit to a camera body. A tapered receiving socket 20a is formed in the top surface of the case for receiving a plug 21a projecting from a combustion-type flash bulb unit, generally indicated as 21.

Plug 21a of combustion-type flash bulb unit 21 is insertable into socket 20a and includes contacts 31a and 31b formed thereon. The combustion-type flash bulb unit 21 includes four upper flash bulbs adapted to be fired in sequence, whereafter the flash bulb unit 21 can be inverted and the upper plug 21b can be inserted into the socket 20a so that the lower four flash bulbs can be fired in sequence. Flash bulb unit 21 is of a type that is well known in the art and is presently commercially available.

Figure 2:
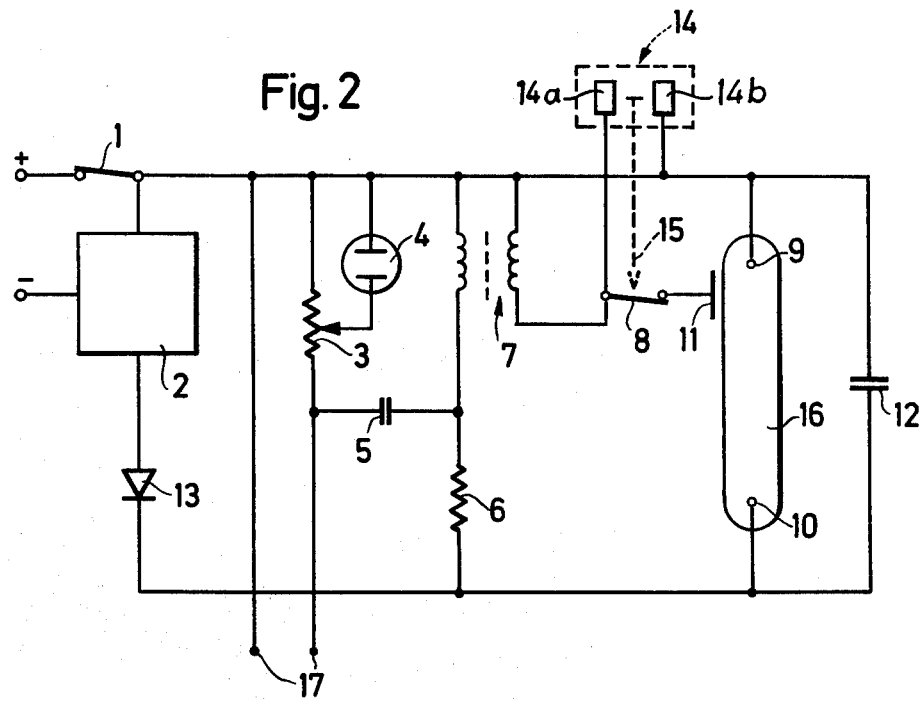
FIG. 2 is a circuit diagram of the dual flash mode unit depicted in FIG. 1.

Reference is now made to FIG. 2, wherein the dual mode circuit of the flash unit, illustrated in FIG. 1, is depicted. An on-off switch 1 is coupled to the positive terminal of a low voltage DC supply (not shown) for preventing the flash unit from being charged when the unit is not in use. The on-off switch 1 is further coupled to a charging circuit 2, which charging circuit converts the low voltage produced by the DC supply to a high voltage to be supplied to a large flash capacitor 12 to effect a charging of same. The flash capacitor 12 is charged in ten to twenty seconds by the high voltage supplied by the charging circuit after the capacitor has been discharged through the flash tube 16. A potentiometer resistor 3 is coupled to an actuation capacitor 5, which actuation capacitor 5 is, in turn, coupled in series with a biasing resistor 6. A load detecting lamp 4 is coupled to the potentiometer resistor 3 and is adapted to be lit in response to the flash capacitor 12 being fully charged, after each ignition of the electronic flash tube 16, in the manner discussed below. The flash unit is actuated by a camera shutter (not shown) bridging the two synchronous connectors 17, which connectors are respectively coupled to each side of the potentiometer resistor 3. A diode 13 is coupled intermediate the charging circuit 2 and the bias resistor 6.

Flash tube 16 includes an anode 9, a cathode 10 and an ignition electrode 11. Additionally, flash capacitor 12 is coupled to the anode and cathode electrodes, respectively, of the flash tube. The ignition electrode 11 is coupled through a cutoff switch 8 to the high-voltage side of a step-up transformer 7 in order to receive high-voltage pulses produced by discharging actuation capacitor 5 through the synchronous connectors 17 when the camera shutter is operated.

Cut-off switch 8 is mechanically connected by a mechanical linkage (schematically illustrated as 15) to the socket 20a formed in the upper surface of the case of the flash unit. Housed in the socket 20a is a contact assembly, generally indicated as 14, supporting contacts 14a and 14b, which contacts are adapted to be electrically coupled to contacts 31a and 31b, respectively, when the plug 21a is inserted into the socket 20a formed in the flash unit. Additionally, when the plug 21a is inserted into the tapered socket opening 20a, mechanical linkage 15 opens the cut-off switch 8, and thereby electrically isolates the ignition electrode 11 of the electronic flash tube from the step-up transformer 7. Accordingly, the high-voltage side of the step-up transformer 7 is disposed through contacts 14a and 14b electrically coupled with contacts 31a and 31b of the high-voltage combustion flash bulb unit 21, to thereby permit the flash bulb to be selectively ignited, in sequence, in the usual manner. Specifically, when the connectors 17 are bridged by the camera shutter, actuation capacitor 5 is discharged and produces an ignition pulse. When the ignition electrode 11 is electrically isolated, the flash capacitor 12 remains charged when the flash bulb is ignited so that actuation capacitor 5 is instantaneously recharged. Thus, a rapid sequence of igniting pulses can be applied to the combustion flash bulb unit to thereby avoid the ten to twenty second charging interval required between each actuation of the electronic flash tube.

Figure 3:
FIG. 3 is a side elevational view of a dual mode flash unit constructed in accordance with a further embodiment of the instant invention.
Figure 4:
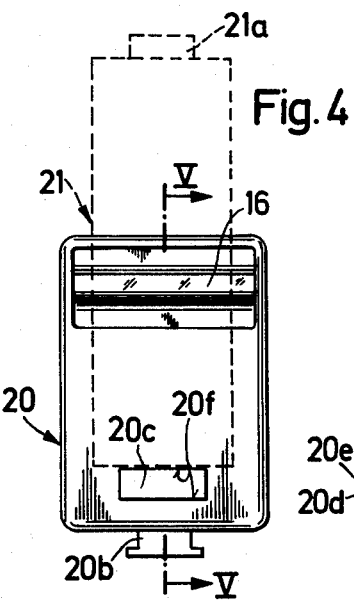
FIG. 4 is a front elevational view of the dual mode flash unit depicted in FIG. 3.
Figure 5:
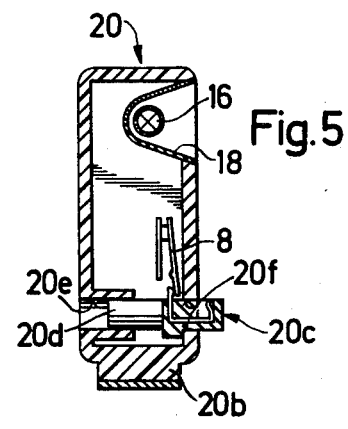
FIG. 5 is a sectional view taken along line V—V of FIG. 4.

Reference is now made to FIGS. 3 through 5, wherein a flash unit constructed in accordance with a further embodiment of the instant invention is depicted, like reference numerals being utilized to denote like elements depicted above. A moveable rectangular socket, generally indicated as 20c, is adapted to be pulled out from the front of the unit. Moveable socket 20c is slideably mounted in a recess 20f formed in the front surface of the case. A cylindrical guide pin 20d is supported by the moveable socket 20c and is displaceably positioned in a bore 20e to permit same to be contacted by a person's finger and pushed forward. When moveable socket 20c is pushed forward, cut-off switch 8 is displaced into an open position, to thereby cut-off the electronic flash tube 16 from the step-up transformer 7, and thereby permit flash bulb unit 21 to be coupled to the step-up transformer in the same manner described above with respect to FIGS. 1 and 2.

Accordingly, the instant invention is specifically directed to a dual mode flash unit for permitting the selective actuation of an electronic flash tube or a high-voltage electronic flash bulb. Specifically, either a stationary or moveable socket is provided in the flash unit to permit a flash bulb unit to be inserted in the socket, cut-off the application of actuation pulses to the electronic flash tube, and insure the ignition of the electronic flash bulbs in response to each actuation pulse produced by the electronic flash unit.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A dual mode electronic flash unit adapted to actuate a high voltage flash bulb, said dual mode electronic flash unit comprising, in combination, comprising an electronic flash tube adapted to be actuated in response to a high-voltage pulse being applied thereto, high-voltage supply means for selectively producing a high-voltage pulse, and contact means constructed and arranged to receive a high-voltage flash bulb and couple same to said high-voltage supply means to receive said high-voltage pulses selectively produced thereby and be ignited in response thereto.

2. A dual mode electronic flash unit as claimed in claim 1, and wherein said contact includes cut-off switch means coupled intermediate said high-voltage supply means and said electronic flash tube for electrically isolating said flash tube from said power supply means.

3. A dual mode electronic flash unit as claimed in claim 1, wherein said contact means includes switch means coupled intermediate said high-voltage supply means and said flash tube, said switch means being adapted to prevent said high-voltage pulses, selectively produced by said high-voltage supply means, from being applied to said electronic flash tube when said electronic flash bulb is received in said contact means.

4. A dual mode electronic flash unit as claimed in claim 3, wherein said contact means includes socket means for receiving a projection disposed on said high-voltage flash bulb, said socket means being adapted to structurally support said electronic tube and electrically couple said electronic flash bulb to said high-voltage supply means.

5. A dual mode electronic flash unit as claimed in claim 1, wherein said contact means includes moveable projecting means adapted to be displaced between a first position in said flash unit and a second position projecting from said flash unit.

6. A dual mode electronic flash unit as claimed in claim 5, and cut-off switch means coupled intermediate said high-voltage supply means and said electronic flash tube, said cut-off switch means being adapted to selectively isolate said electronic flash tube from said high-voltage supply means when said cut-off switch means is disposed in an open position, said moveable projecting means being adapted to dispose said cut-off switch means in an open position when said moveable projecting means is displaced to a projecting position.

* * * * *